(12) United States Patent
Yamada et al.

(10) Patent No.: US 9,012,535 B2
(45) Date of Patent: Apr. 21, 2015

(54) METHOD FOR PRODUCING NATURAL RUBBER MASTERBATCH, NATURAL RUBBER MASTERBATCH, RUBBER COMPOSITION, AND TIRE

(75) Inventors: Hiroshi Yamada, Tokyo (JP); Atsushi Nakayama, Tokyo (JP); Tomohiro Urata, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 266 days.

(21) Appl. No.: 12/745,403

(22) PCT Filed: Nov. 25, 2008

(86) PCT No.: PCT/JP2008/071315
§ 371 (c)(1),
(2), (4) Date: Aug. 18, 2010

(87) PCT Pub. No.: WO2009/072413
PCT Pub. Date: Jun. 11, 2009

(65) Prior Publication Data
US 2010/0311898 A1    Dec. 9, 2010

(30) Foreign Application Priority Data

Dec. 3, 2007 (JP) ................................. 2007-312686
Feb. 12, 2008 (JP) ................................. 2008-030347

(51) Int. Cl.
*C08J 3/20* (2006.01)
*C08K 3/04* (2006.01)
*C08J 3/22* (2006.01)
*B60C 1/00* (2006.01)
*C08J 3/205* (2006.01)
*C08K 5/00* (2006.01)

(52) U.S. Cl.
CPC ............... *C08J 3/226* (2013.01); *B60C 1/0016* (2013.04); *C08J 3/2053* (2013.01); *C08J 2307/02* (2013.01); *C08J 2321/00* (2013.01); *C08J 2407/00* (2013.01); *C08K 3/04* (2013.01); *C08K 5/0025* (2013.01)

(58) Field of Classification Search
CPC .......... C08K 3/0033; C08K 3/04; C08K 3/36; C08L 19/00; C08L 19/02
USPC ................. 524/425, 432, 437, 433, 451, 447, 524/495–496; 523/156, 351
See application file for complete search history.

(56) References Cited

U.S. PATENT DOCUMENTS

| | | | |
|---|---|---|---|
| 5,059,408 A | 10/1991 | Mito | |
| 5,093,407 A | 3/1992 | Komai et al. | |
| 5,124,396 A | 6/1992 | Branan, Jr. et al. | |
| 5,264,521 A | 11/1993 | Mukai et al. | |
| 5,516,833 A | 5/1996 | Ohashi et al. | |
| 6,099,818 A | 8/2000 | Freund et al. | |
| 6,841,606 B2* | 1/2005 | Yanagisawa et al. | 524/432 |
| 7,585,913 B2* | 9/2009 | Nakayama et al. | 524/495 |
| 7,786,208 B2* | 8/2010 | Kondou | 524/575.5 |
| 7,960,466 B2* | 6/2011 | Yamada et al. | 524/495 |
| 2002/0111413 A1 | 8/2002 | Lopez-Serrano Ramos et al. | |
| 2003/0088006 A1* | 5/2003 | Yanagisawa et al. | 524/425 |
| 2003/0203992 A1 | 10/2003 | Mabry et al. | |
| 2006/0199894 A1 | 9/2006 | Nakayama et al. | |
| 2008/0269380 A1 | 10/2008 | Mamiya et al. | |

FOREIGN PATENT DOCUMENTS

| | | |
|---|---|---|
| EP | 0608892 A1 | 8/1994 |
| EP | 1728820 A1 | 12/2006 |
| JP | 02-286727 A | 11/1990 |
| JP | 2004-099625 A | 4/2004 |
| JP | 2006-265311 A | 3/2005 |
| JP | 2005-272734 A | 10/2005 |
| JP | 2006-143822 A | 6/2006 |
| JP | 2006-213804 A | 8/2006 |
| JP | 2006-219618 A | 8/2006 |
| WO | 2006/068078 A1 | 6/2006 |
| WO | 2007/066689 A1 | 6/2007 |

OTHER PUBLICATIONS

Machine Translation of JP 2005-272734.*
Wang, Meng-Jiao et al., "Carbon Black", Kirk-Othmer Encyclopedia of Chemical Technology, 2005, vol. 4, pp. 761-803.
Excerpt from the Carbon Black Yearbook, 1994, No. 44, 3 pages total.
Wang, M.-J. et al., "NR/Carbon Black Masterbatch Produced with Continuous Liquid Phase Mixing", KGK Kautschuk Gummi Kunststoffe, 55, Jahrgang, Nr. 7—Aug. 2002, 10 pages total.
Communication dated Aug. 28, 2014, issued by the European Patent Office in corresponding European Application No. 08856200.4.

* cited by examiner

*Primary Examiner* — Hannah Pak
(74) *Attorney, Agent, or Firm* — Sughrue Mion, PLLC

(57) ABSTRACT

The present invention is to provide a production method of a natural rubber master batch including a step of mixing a natural rubber latex and an aqueous slurry having carbon black dispersed in water, wherein a mixing amount of the carbon black is from 10 to 100 parts by mass based on 100 parts by mass of a natural rubber component; and the carbon black is satisfied with the relationships expressed by (1) 120<CTAB adsorption specific surface area<160, (2) 50<24M4DBP<100, and (3) 75<toluene discoloration transmittance<95. Also, the present invention is to provide a natural rubber master batch obtained by the subject production method. Furthermore, the present invention is to provide a rubber composition using the foregoing natural rubber master batch and a tire using the subject rubber composition.

15 Claims, No Drawings

METHOD FOR PRODUCING NATURAL RUBBER MASTERBATCH, NATURAL RUBBER MASTERBATCH, RUBBER COMPOSITION, AND TIRE

TECHNICAL FIELD

The present invention relates to a natural rubber master batch and a production method of the same. Also, the present invention relates to a rubber composition using the subject natural rubber master batch and a tire using this rubber composition.

BACKGROUND ART

In tires for rough roads or heavy loads, for the purpose of enhancing abrasion resistance, low structure carbon black has hitherto been widely used. However, in order to prevent occurrence of the matter that rubber is soft so that it is easily deformed, the carbon black is frequently highly filled. For that reason, there was involved a problem that not only dispersion of carbon black in the rubber is deteriorated so that sufficient abrasion resistance is not obtained, but also increased heat generation is caused.

In order to improve processability, reinforcing properties and abrasion resistance, there is known a production method of a natural rubber master batch including an amide linkage cleavage step of cleaving amide linkages in a natural rubber latex and a step of mixing the latex after the subject amide linkage cleavage step and an aqueous slurry of an inorganic filler such as carbon black, silica, alumina, calcium carbonate, etc. dispersed in water (see, for example, Patent Document 1).

However, Patent Document 1 (JP-A-2004-99625) does not disclose means for enhancing dispersibility of carbon black. Accordingly, in tires using the natural rubber master batch obtained by the production method of Patent Document 1, it is unclear whether or more low heat build-up is obtainable.

DISCLOSURE OF THE INVENTION

Problem to be Solved by the Invention

An object of the present invention is to provide a natural rubber master batch capable of producing a tread rubber composition having favorable abrasion resistance without impairing low heat build-up and a production method of the same. Also, an object of the present invention is to provide a rubber composition which is applicable to a tread rubber composition having favorable abrasion resistance without impairing low heat build-up and a tire using the subject rubber composition.

Means for Solving the Problems

In order to achieve the foregoing objects, the present inventors made extensive and intensive investigations. As a result, they have arrived at the present invention as described below and found that the foregoing problems can be solved.

Specifically, the present invention is concerned with a production method of a natural rubber master batch including a mixing step of mixing a natural rubber latex and an aqueous slurry having carbon black dispersed in water, wherein a mixing amount of the foregoing carbon black is from 10 to 100 parts by mass based on 100 parts by mass of a natural rubber component in the foregoing natural rubber latex; and the subject carbon black is satisfied with the relationships expressed by (1) a cetyltrimethylammonium bromide (hereinafter sometimes referred to as "CTAB") adsorption specific surface area falling within the range of 120<CTAB adsorption specific surface area $(m^2/g)$<160, (2) a compressed DBP oil absorption (hereinafter sometimes referred to as "24M4 DBP") falling within the range of 50<24M4 DBP (mL/100 g)<100, and (3) a toluene discoloration transmittance falling within the range of 75<toluene discoloration transmittance (%)<95.

Also, the present invention is concerned with a natural rubber master batch produced by the foregoing production method of a natural rubber master batch. Furthermore, the present invention is concerned with a rubber composition using the foregoing natural rubber master batch. Moreover, the present invention is concerned with a tire using the foregoing rubber composition.

According to the present invention, it is possible to provide a natural rubber master batch from which a tread rubber composition having favorable abrasion resistance can be produced without impairing low heat build-up and a production method of the same. Also, it is possible to provide a rubber composition which can be applied to a tread rubber composition having favorable abrasion resistance without impairing low heat build-up and a tire using the subject rubber composition.

BEST MODE FOR CARRYING OUT THE INVENTION

[1. Natural Rubber Master Batch and Production Method of the Same]

The production method of a natural rubber master batch of the present invention includes a mixing step of mixing a natural rubber latex and an aqueous slurry having carbon black dispersed in water. It is preferable that an amide linkage cleavage step is included prior to the mixing step; and it is preferable that a coagulation step and a drying step are included after the mixing step. The respective steps are hereunder described.

(Mixing Step)

A mixing amount of carbon black in mixing a natural rubber latex and an aqueous slurry is regulated at from 10 to 100 parts by mass based on 100 parts by mass of a natural rubber component in the natural rubber latex. When the mixing amount of carbon black is less than 10 parts by mass, sufficient abrasion resistance is not obtained, whereas when it exceeds 100 parts by mass, low heat build-up is lowered. The mixing amount of carbon black is preferably from 20 to 80 parts by mass, and more preferably from 30 to 60 parts by mass.

In the present invention, a cetyltrimethylammonium bromide (CTAB) adsorption specific surface area $(m^2/g)$ of carbon black is regulated so as to fall within the range of 120<CTAB<160. When the CTAB specific surface area is not more than 120, sufficient abrasion resistance is not secured, whereas when it is 160 or more, heat build-up is largely deteriorated.

Also, a compressed DBP oil absorption (24M4 DBP) is regulated so as to fall within the range of 50<24M4 DBP (mL/100 g)<100. When the 24M4 DBP is not more than 50, an improving effect of abrasion resistance is not obtained, whereas when it is 100 or more, abrasion resistance is lowered. The 24M4 DBP is preferably from 55 to 90, and more preferably from 65 to 85.

A toluene discoloration transmittance is regulated so as to fall within the range of 75<toluene discoloration transmittance (%)<95. Though the master batch is formed in a slurry having carbon black dispersed in an aqueous system, since the carbon black is insoluble in water, it is hardly mixed. However, it is meant that so-called low-toluene carbon black whose toluene discoloration transmittance falls within the foregoing range has a number of functional groups; and of the functional groups, an oxygen-containing group increases polarity, and therefore, when its number is large, dispersibility of carbon black in water is enhanced. Also, it is meant that the number of a reaction site with a polymer is large. Accordingly, when carbon black having a large number of oxygen-containing groups (low-toluene carbon black) is applied to a master batch, thereby increasing dispersibility in the aqueous system and enhancing reactivity with the polymer, the reinforcing properties with the polymer can be enhanced, and the abrasion resistance can be enhanced. The toluene discoloration transmittance is preferably from 80 to 93, and more preferably from 83 to 93. As the foregoing carbon black to be used in the present invention, for example, commercially available products can also be used.

Also, it is preferable that particle size distribution of carbon black in the aqueous slurry is not more than 25 μm in terms of a volume average particle size (mv) and not more than 30 μm in terms of a 90 volume % particle size (D90). When the volume average particle size (mv) is not more than 25 μm, and the 90 volume % particle size (D90) is not more than 30 μm, dispersion of carbon black in the rubber becomes more favorable, and the reinforcing properties and abrasion resistance are more enhanced.

When a shearing force is excessively applied to the slurry for the purpose of making the particle size of carbon black small, the structure of carbon black is broken, thereby causing a lowering of the reinforcing properties. Thus, it is preferable to perform the mixing so as to maintain the 24M4 DBP oil absorption of carbon black dried and recovered from the aqueous slurry at 93% or more, and more preferably 96% or more of the 24M4 DBP oil absorption before dispersing in water.

In the mixing step, it is necessary that the aqueous slurry having carbon black dispersed in water is produced in advance. However, publicly known methods can be employed for this production method of an aqueous slurry, and there is no particular restriction.

For the production of the aqueous slurry of carbon black, a high-shear mixer of rotor-stator type, a high-pressure homogenizer, an ultrasonic homogenizer, a colloid mill, a homo-mixer and the like are useful. For example, it is possible to prepare the subject aqueous slurry by charging prescribed amounts of carbon black and water in a homomixer and stirring the mixture for a certain period of time.

A concentration of carbon black in the aqueous slurry is preferably from 0.5% by weight to 30% by weight relative to the slurry, and its especially preferred range is from 1% by weight to 15% by weight.

A natural rubber wet master batch is obtained through the foregoing mixing step. The natural rubber master batch of the present invention is obtained by subjecting this natural rubber wet master batch to various treatments. However, in the present invention, as already described, it is preferable that various steps are provided before and after the mixing step.

(Amide Linkage Cleavage Step)

The natural rubber latex to be used in the mixing step may be one having gone through a step of cleaving amide linkages in the latex. When the amide linkages are cleaved in advance, a drawback that an increase in the viscosity of rubber is brought by entanglement of molecules with each other due to hydrogen bonding properties between amide linkages can be reduced, and processability can be improved.

In such an amide linkage cleavage step, it is preferable to use a protease and/or an aromatic polycarboxylic acid derivative. The protease as referred to herein is one having properties such that it hydrolyzes amide linkages present in a surface layer component of a natural rubber latex particle, and examples thereof include an acidic protease, a neutral protease, an alkaline protease, etc. In the present invention, an alkaline protease is especially preferable in view of the effectiveness.

In the case of performing cleavage of amide linkages by a protease, the cleavage may be carried out under conditions suitable for an enzyme to be mixed. For example, in the case where a natural rubber latex is mixed with Alkalase 2.5 L Type DX, manufactured by Novozymes A/S, it is desirable that the treatment is usually carried out in the range of from 20 to 80° C. On that occasion, the treatment is usually carried out at a pH in the range of from 6.0 to 12.0. Also, the addition amount of the protease is usually in the range of from 0.01% by weight to 2% by weight, and preferably from 0.02% by weight to 1% by weight relative to the natural rubber latex.

Also, in a method using an aromatic polycarboxylic acid derivative, the aromatic polycarboxylic acid derivative as referred to herein is a compound represented by the following general formula (I).

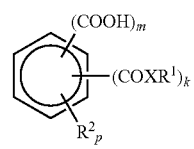

(I)

[In the formula (I), m and k are each an integer of from 1 to 3; p is an integer of from 1 to 4; m+k+p=6; and when m≥2, a part or all of the carboxyl groups may be made anhydrous within the molecule. X is oxygen, $NR^3$ ($R^3$ is hydrogen or an alkyl group having from 1 to 24 carbon atoms) or $-O(R^4O)_q$ ($R^4$ is an alkylene group having from 1 to 4 carbon atoms; and q is an integer of from 1 to 5). $R^1$ is an alkyl group having from 1 to 24 carbon atoms, an alkenyl group having from 2 to 24 carbon atoms or an aryl group having from 6 to 24 carbon atoms; $R^2$ is hydrogen, —OH, an alkyl group, an alkenyl group or an aryl group; and both $R^1$ and $R^2$ may be partly or entirely substituted with hydrogen or a halogen.]

In the present invention, of the aromatic polycarboxylic acid derivatives represented by the foregoing general formula (I), derivatives of any one of phthalic acid, trimellitic acid, pyromellitic acid and anhydrides thereof are preferable. Specific examples thereof include monostearyl phthalate, monodecyl phthalate, monooctyl phthalamide, polyoxyethylene-lauryl phthalate, monodecyl trimellitate, monostearyl trimellitate, monostearyl pyromellitate, distearyl pyromellitate, etc. The conditions for mixing the aromatic polycarboxylic acid derivative with the natural rubber latex may be properly chosen depending upon the kind of the natural rubber latex or the kind of the aromatic polycarboxylic acid to be used.

The addition amount of the aromatic polycarboxylic acid derivative to be blended is preferably from 0.01 to 30% by weight relative to the natural rubber latex. When the addition amount is less than 0.01% by weight, there is a possibility that a Mooney viscosity cannot be sufficiently lowered. On the other hand, when it exceeds 30% by weight, not only an effect corresponding to the increased amount is not obtained, but also there is a possibility that failure characteristics, etc. of vulcanized rubber are adversely affected. Though the addition amount thereof varies within the foregoing blending range depending upon the kind or grade of the natural rubber latex to be used or the like, it is desirably in the range of from 0.05 to 20% by weight in view of costs, physical properties and the like.

Also, in the amide linkage cleavage step, it is desirable that a surfactant is further added for the purpose of enhancing stability of the latex. As the surfactant, anionic, cationic, nonionic or amphoteric surfactants can be used, with anionic or nonionic surfactants being especially preferable. Though the addition amount of the surfactant can be properly regulated depending upon properties of the natural rubber latex, it is usually from 0.01% by weight to 2% by weight, and preferably from 0.02% by weight to 1% by weight relative to the natural rubber latex. Though it is preferable that the addition of the surfactant is carried out in the amide linkage cleavage step, so far as the addition is carried out at least before mixing in the mixing step, there is no particular restriction.

(Coagulation Step)

It is preferable that the natural rubber wet master batch obtained through the mixing step is coagulated in this coagulation step.

As the coagulation method of the master batch, the coagulation is carried out using a coagulant, for example, acids such as formic acid, sulfuric acid, etc. or salts such as sodium chloride, etc. in a similar manner to usual methods. Also, in the present step, there may be the case where the coagulation is carried out by mixing the natural rubber latex and the foregoing slurry without adding a coagulant.

(Drying Step)

It is preferable that a drying treatment is carried out as a final step of the production of a master batch. In the present step, a usual dryer such as a vacuum dryer, an air dryer, a drum dryer, a band dryer, etc. can be used. However, it is preferable to perform drying while applying a mechanical shearing force for the purpose of more enhancing dispersibility of carbon black. According to this, it is possible to obtain rubber which is excellent in processability, reinforcing properties and low fuel consumption. Though this drying can be carried out using a general kneader, it is preferable to use a continuous kneader from the viewpoint of industrial productivity. Furthermore, it is more preferable to use a corotating or counter-rotating multiaxial kneading extruder.

In the step of performing the foregoing drying while applying a shearing force, it is preferable that the water content in the master batch prior to the drying step is 10% or more. This is because when this water content is less than 10%, there is a possibility that an improvement width for dispersing carbon black in the drying step becomes small.

In the production method of a natural rubber master batch of the present invention, in addition to carbon black, various additives, for example, chemicals such as silica and other inorganic fillers (alumina, alumina monohydrate, aluminum hydroxide, aluminum carbonate, clay, aluminum silicate, calcium carbonate, etc.), surfactants, vulcanizing agents, antioxidants, colorants, dispersants, etc. can be added in any of the respective steps, if desired.

The natural rubber master batch of the present invention is produced by the foregoing production method. In the subject natural rubber master batch, since the prescribed carbon black keeps high dispersibility, a rubber composition using this is well balanced among processability, reinforcing properties and abrasion resistance on a high level without impairing low heat build-up.

[2. Rubber Composition]

The rubber composition of the present invention is obtained by using the natural rubber master batch of the present invention. To this rubber composition, various chemicals which are usually used in the rubber industry field, for example, vulcanizing agents, vulcanization accelerators, antioxidants, etc. can be added within the range where the objects of the present invention are not impaired.

In particular, it is preferable that the rubber composition of the present invention is one obtained by dry mixing the natural rubber master batch of the present invention and silica. By mixing silica, it is possible to form a rubber composition which is more enhanced in abrasion resistance and from which an appearance after traveling on a rough road suitable for tires for rough roads or heavy loads can be obtained. In order to favorably obtain such characteristics, the amount of silica to be mixed is from 1 to 30 parts by mass based on 100 parts by mass of the natural rubber component. Taking into consideration a balance between appearance and workability, it is more preferably from 5 to 25 parts by mass.

[3. Tire]

A tire (pneumatic tire) of the present invention is one obtained by using the rubber composition of the present invention.

In the subject tire, by using the foregoing rubber composition in a tread part, it is possible to enhance a grip performance in a wide temperature region without adversely affecting workability and heat resistance. In the tire of the present invention, a structure which has hitherto been publicly known can be adopted, and it can be produced by a usual method.

As an example of the tire, there is suitably exemplified a pneumatic tire composed of a pair of bead parts, a carcass extending in a toroidal form to the subject bead part, a belt for hooping a crown part of the subject carcass and a tread, or the like. The subject tire may have a radial structure or may have a bias structure.

The structure of the tread is not particularly restricted and may be a single-layer structure or may be a multi-layer structure. The tread may have a so-called cap-base structure which is configured to include a cap part as an upper layer coming into direct contact with the road surface and a base part as a lower layer to be arranged adjacent to the inside of the tire of this cap part.

In the present invention, it is preferable that at least the cap part or the base part is formed of the rubber composition of the present invention. Such a tire is not particularly restricted with respect to its production method but can be, for example, produced in the following manner. That is, first of all, the rubber composition of the present invention is prepared, and this rubber composition is stuck onto an unvulcanized base part which is stuck in advance onto a crown part of a green pneumatic tire case. Then, a tire can be produced by vulcanization molding using a prescribed mold at a prescribed temperature under a prescribed pressure.

EXAMPLES

Next, the present invention is described in more detail with reference to the Examples, but it should be construed that the present invention is not limited to these Examples at all. Each of various measurements in the respective Examples and Comparative Examples was carried out in the following manner.

(1) CTAB Specific Surface Area:
Measured according to ISO 6810.
(2) 24M4 DBP Oil Absorption:
Measured according to ISO 6894.

(3) Retention of 24M4 DBP Oil Absorption (%):

600 g of a uniform carbon slurry as prepared was taken, spread on a stainless steel-made vat uniformly as far as possible and then dried in an oven at 105° C. for 3 hours. The obtained flaky dried carbon was measured with respect to 24M4 DBP according to ISO 6894.

(4) Toluene Discoloration Transmittance:

A transmittance percent of a filtrate of a mixture of carbon black and toluene was measured according to Item 8, B-process of JIS K6218 (1997) and expressed in terms of a percentage to pure toluene.

(5) Abrasion Resistance Test:

Each test rubber composition was applied to a tire tread, thereby preparing a tire having a size of 1000R20 14PR; and after traveling on a rough road over 6,000 km, an abrasion resistance index was calculated according to the following expression on a basis of a travel distance per mm of wear of such a tire. The larger this value, the better the abrasion resistance.

Abrasion resistance index={(Travel distance of test tire)/(Abrasion wear)}/{(Travel distance of tire of Comparative Example 4)/(Abrasion wear)}

In Examples 6 to 11, the "travel distance of tire of Comparative Example 4" in the foregoing expression is replaced by "travel distance of tire of Example 10".

(6) Heat Generation Test:

A tan δ (loss factor) was determined using a TOYOSEIKI's spectrometer (dynamic strain amplitude: 1%, frequency: 52 Hz, measurement temperature: 25° C.), and a heat generation index was calculated according to the following expression and evaluated. As to the heat build-up, the smaller the numerical value of heat generation index, the more excellent the low heat build-up.

Heat generation index=(Tan δ of each test specimen)/(Tan δ of specimen of Comparative Example 4)

Example 1

(Production of Natural Rubber Latex)

A field latex of natural rubber (rubber content: 24.2%) was diluted with deionized water to have a rubber content of 20%. To 100 parts by mass of this natural rubber latex, 0-5 parts by mass of an anionic surfactant (Demol N, manufactured by Kao Corporation) and 0.1 parts by mass of an alkaline protease (Alkalase 2.5 L Type DX, manufactured by Novozymes A/S) were added, and the mixture was stirred at 40° C. for 8 hours, thereby cleaving amide linkages in the natural rubber (amide linkage cleavage step).

(Production of Aqueous Slurry of Carbon Black)

1,425 g of deionized water and 75 g of Carbon Black C were charged into a colloid mill having a rotor diameter of 50 mm, and the mixture was stirred for 10 minutes at a rotation speed of 5,000 rpm under a rotor-stator gap of 0.3 mm, thereby producing an aqueous slurry.

The particle size distribution (volume average particle size (mv) and 90 volume % particle size (D90)) of carbon black in the aqueous slurry and the retention of 24M4 DBP oil absorption of carbon black dried and recovered from the aqueous slurry are shown in the following Table 1-1.

The natural rubber latex and the aqueous slurry were mixed in a mass ratio of natural rubber component to carbon black of 100/60, thereby producing a natural rubber wet master batch (mixing step). Formic acid was added while stirring the natural rubber wet master batch until the mixture reached a pH of 4.5, thereby coagulating the natural rubber wet master batch (coagulation step). The natural rubber wet master batch after the coagulation was recovered, washed with water and then dehydrated until the water content reached about 40%. Thereafter, the resulting master batch was dried at a barrel temperature of 120° C. and at a rotation speed of 100 rpm using a twin-screw kneading extruder (corotating screw diameter: 30 mm, L/D=35, three vent holes), manufactured by Kobe Steel, Ltd., thereby producing a natural rubber master batch (drying step).

100 parts by mass of the thus produced natural rubber master batch was compounded with 3 parts by mass of zinc white (zinc white No. 1, manufactured by Hakusui. Chemical Industries, Ltd.), 1.5 parts by mass of sulfur (manufactured by Karuizawa. Seiren-sho K.K.), 2 parts by mass of stearic acid (manufactured by NOF Corporation), 1 part by mass of a vulcanization accelerator (N-cyclohexyl-2-benzothiazyl-sulfenamide (Nocceler CZ, manufactured by Ouchi Shinko Chemical Industrial Co., Ltd.)) and 1 part by mass of an antioxidant (N-(1,3-dimethylbutyl)-N'-phenyl-p-phenylenediamine (Nocrac 6C, manufactured by Ouchi Shinko Chemical Industrial Co., Ltd.)), and the mixture was kneaded by an internal mixer, thereby producing a rubber composition. This rubber composition was evaluated with respect to abrasion resistance and heat build-up. The results are shown in the following Table 1-1.

Examples 2 to 5 and Comparative Examples 4 and 5

Natural rubber master batches and rubber compositions were produced in the same manner as in Example 1, except for changing the Carbon Black C to one as shown in the following Table 1-1. These rubber compositions were evaluated with respect to abrasion resistance and heat build-up. The results are shown in the following Table 1-1.

Comparative Examples 1 to 3

Rubber compositions were produced in the same manner as in Example 1, except for using a master batch prepared by compounding 100 parts by mass of natural rubber and 45 parts by mass of carbon black as shown in the following Table 1-1 in an internal mixer by means of so-called dry kneading in place of the natural rubber master batch.

These rubber compositions were evaluated with respect to abrasion resistance and heat build-up. The results are shown in the following Table 1-1.

TABLE 1-1

|  | Example 1 | Example 2 | Example 3 | Example 4 | Example 5 |
|---|---|---|---|---|---|
| Mixing method | Master batch | Master batch | Master batch | Master batch | Master batch |
| Carbon black | C | D | E | F | G |
| CTAB (m²/g) | 128 | 141 | 155 | 122 | 158 |

TABLE 1-1-continued

|  |  | | | | |
|---|---|---|---|---|---|
| 24M4DBP (mL/100 g) | 78 | 71 | 83 | 51 | 66 |
| Retention of 24M4DBP (%) | 98 | 97 | 98 | 99 | 99 |
| Toluene discoloration transmittance (%) | 83 | 90 | 82 | 92 | 76 |
| Particle size distribution (μm) | Volume average particle size (mv) | 9.5 | 9.9 | 10.2 | 9.2 | 9.9 |
|  | 90 volume % particle size (D90) | 12.5 | 14.0 | 16.8 | 12.0 | 13.1 |
| Abrasion resistance (index) | 110 | 116 | 122 | 114 | 124 |
| Heat build-up (index) | 89 | 96 | 99 | 92 | 107 |

|  |  | Comparative Example 1 | Comparative Example 2 | Comparative Example 3 | Comparative Example 4 | Comparative Example 5 |
|---|---|---|---|---|---|---|
| Mixing method |  | Dry mixing | Dry mixing | Dry mixing | Master batch | Master batch |
| Carbon black |  | A | C | H | A | B |
| CTAB (m²/g) |  | 124 | 128 | 111 | 124 | 137 |
| 24M4DBP (mL/100 g) |  | 97 | 78 | 98 | 97 | 103 |
| Retention of 24M4DBP (%) |  | — | — | — | 96 | 95 |
| Toluene discoloration transmittance (%) |  | 98 | 83 | 100 | 98 | 92 |
| Particle size distribution (μm) | Volume average particle size (mv) | — | — | — | 9.3 | 10.4 |
|  | 90 volume % particle size (D90) | — | — | — | 12.2 | 14.0 |
| Abrasion resistance (index) |  | 95 | 88 | 84 | 100 | 93 |
| Heat build-up (index) |  | 105 | 102 | 95 | 100 | 108 |

Examples 12 to 14

Natural rubber master batches and rubber compositions were produced in the same manner as in Example 1, except for using a natural rubber latex which had not gone through the amide cleavage step and changing the carbon black to one as shown in the following Table 1-2. These rubber compositions were evaluated with respect to abrasion resistance and heat build-up. The results are shown in the following Table 1-2.

TABLE 1-2

|  |  | Example 12 | Example 13 | Example 14 |
|---|---|---|---|---|
| Mixing method |  | Master batch | Master batch | Master batch |
| Carbon black |  | C | E | G |
| CTAB (m²/g) |  | 128 | 155 | 158 |
| 24M4DBP (mL/100 g) |  | 78 | 83 | 66 |
| Retention of 24M4DBP (%) |  | 98 | 98 | 99 |
| Toluene discoloration transmittance (%) |  | 83 | 82 | 76 |
| Particle size distribution (μm) | Volume average particle size (mv) | 9.5 | 10.2 | 9.9 |
|  | 90 volume % particle size (D90) | 12.5 | 16.8 | 13.1 |
| Abrasion resistance (index) |  | 104 | 118 | 120 |
| Heat build-up (index) |  | 91 | 100 | 109 |

Here, Carbon Black A is N115; B is N134; and H is N220. Also, Carbon Blacks C to G are those produced under conditions as shown in the following Table 2, respectively.

TABLE 2

|  |  | C | D | E | F | G |
|---|---|---|---|---|---|---|
| Introduction amount of air for production | kg/h | 1350 | 1530 | 1570 | 1270 | 1550 |
| Preheating temperature of air | °C. | 555 | 570 | 630 | 550 | 640 |
| Introduction amount of fuel | kg/h | 65 | 77 | 80 | 60 | 70 |
| Introduction amount of raw material | kg/h | 270 | 277 | 268 | 275 | 268 |
| Atomizing pressure of raw material oil | MPa | 1.6 | 1.7 | 1.6 | 1.4 | 1.5 |
| Preheating temperature of raw material oil | °C. | 205 | 200 | 205 | 190 | 195 |
| Potassium amount (ratio to raw material oil) | ppm | 104 | 150 | 89 | 540 | 320 |

As shown in Tables 1-1 and 1-2, all of the rubber compositions which meet all of the requirements of the present invention as in Examples 1 to 5 and Examples 12 to 14 exhibited remarkable effects for surface improvement and appropriate structure as compared with the rubber compositions of Comparative Examples 1 to 5. As a result, the abrasion resistance was remarkably enhanced, and both abrasion resistance and low heat build-up could be made compatible with each other.

Example 6

100 parts by mass of the master batch of Example 5 was compounded with 3 parts by mass of zinc white (zinc white No. 1, manufactured by Hakusui Chemical Industries, Ltd.), 1.5 parts by mass of sulfur (manufactured by Karuizawa Seiren-sho K.K.), 2 parts by mass of stearic acid (manufactured by NOF Corporation) 1 part by mass of a vulcanization accelerator (N-cyclohexyl-2-benzothiazylsulfenamide (Nocceler CZ, manufactured by Ouchi Shinko Chemical Industrial Co., Ltd.)), 1 part by mass of an antioxidant (N-(1,3-dimethylbutyl)-N'-phenyl-p-phenylenediamine (Nocrac 6C, manufactured by Ouchi Shinko Chemical Industrial Co., Ltd.)) and 1 part by mass of silica (Nipsil AQ, manufactured by Tosoh Silica Corporation), and the mixture was kneaded by an internal mixer, thereby producing a rubber composition. This rubber composition was evaluated with respect to abrasion resistance in the same manner as in Example 1 and also evaluated with respect to appearance after traveling on a rough road and workability as described below. The results are obtained in the following Table 3.

(7) Evaluation of Appearance after Traveling on a Rough Road:

Each test rubber composition was applied to a tire tread, thereby preparing various tires having a size of 1000R20 14 PR. After traveling on a rough road over 6,000 km, the tire tread after traveling was observed by 20 persons, and its appearance was evaluated according to four grades. A to D as evaluation indexes are as follows.

[A] Flat state close to a tire tread after traveling on a smooth road.

[B] State that a defective volume from an average surface due to cutting or chipping is extremely small.

[C] State that a defective volume from an average surface due to cutting or chipping is small.

[D] State that a defective volume from an average surface due to cutting or chipping is slightly large.

(8) Workability:

In sheet rolling works after kneading, its workability was evaluated. ○, Δ and X as evaluation indexes are as follows.

○: Roll-up properties around a roll are good, and a time until forming a sheet shape is within 5 minutes.

Δ: Roll-up properties around a roll are slightly poor, and a time until forming a sheet shape is within 10 minutes.

X Roll-up properties around a roll are poor, and even when the works are continued for 10 minutes or more, a sheet shape is not formed.

Examples 7 to 11

Rubber compositions were prepared and evaluated in the same manner as in Example 6, except for changing the mixing amount of silica as shown in the following Table 3.

TABLE 3

|  | Example 6 | Example 7 | Example 8 | Example 9 | Example 10 | Example 11 |
|---|---|---|---|---|---|---|
| Carbon black (part by mass) | 45 | 45 | 45 | 45 | 45 | 45 |
| Silica (part by mass) | 1 | 10 | 15 | 30 | 0 | 35 |
| Abrasion resistance (index) | 103 | 108 | 113 | 121 | 100 | — |
| Appearance after traveling on a rough road | D | C | B | A | D | — |
| Workability | ○ | ○ | ○ | Δ | ○ | X |

It is noted from the foregoing Table 3 that the rubber compositions having from 1 to 30 parts by mass of silica mixed therein are largely enhanced with respect to appearance after traveling on a rough road and abrasion resistance as compared with the case where silica is not contained (Example 10) and the case where the mixing ratio of silica exceeds 30 parts by mass (Example 11).

Industrial Applicability

The natural rubber master batch rubber of the present invention is suitably used for tread rubbers of various tires, for example, radial tires for buses and trucks, radial tires for passenger cars, radial tires for construction vehicles, etc.

The invention claimed is:

1. A production method of a natural rubber master batch comprising a mixing step of mixing a natural rubber latex and an aqueous slurry having carbon black dispersed in water, wherein a mixing amount of the carbon black is from 10 to 100 parts by mass based on 100 parts by mass of a natural rubber component in the natural rubber latex; and the carbon black is satisfied with the relationships expressed by:

(1) a cetyltrimethylammonium bromide (CTAB) adsorption specific surface area falling within the range of 120<CTAB adsorption specific surface area $(m^2/g)$<160, (2) a compressed DBP oil absorption (24M4 DBP) falling within the range of 50<24M4 DBP (mL/100 g)<100, and (3) a toluene discoloration transmittance falling within the range of 76≤toluene discoloration transmittance (%)<83.

2. The production method of a natural rubber master batch according to claim 1, wherein in the mixing step, (1) particle size distribution of carbon black in the aqueous slurry is not more than 25 μm in terms of a volume average particle size (mv) and not more than 30 μm in terms of a 90 volume % particle size (D90), and (2) the 24M4 DBP oil absorption of carbon black dried and recovered from the aqueous slurry is maintained at 93% or more of the 24M4DBP oil absorption before dispersing in water.

3. The production method of a natural rubber master batch according to claim 1, wherein the natural rubber latex is one having gone through an amide linkage cleavage step of cleaving amide linkages in the natural rubber latex.

4. The production method of a natural rubber master batch according to claim 3, wherein a protease and/or an aromatic polycarboxylic acid derivative is used in the amide linkage cleavage step.

5. The production method of a natural rubber master batch according to claim 4, wherein the protease is an alkaline protease.

6. The production method of a natural rubber master batch according to claim 1, wherein a surfactant is added in the natural rubber latex and/or the aqueous slurry at least before mixing in the mixing step.

7. The production method of a natural rubber master batch according to claim 1, further comprising
 a coagulation step of coagulating a natural rubber wet master batch obtained through the mixing step, and
 a drying step of subjecting the natural rubber wet master batch to a drying treatment, wherein
 the drying treatment in the drying step is a treatment of performing drying while applying a mechanical shearing force.

8. The production method of a natural rubber master batch according to claim 7, wherein the drying treatment is carried out using a continuous kneader.

9. The production method of a natural rubber master batch according to claim 8, wherein the continuous kneader is a multiaxial kneading extruder.

10. A natural rubber master batch produced by the production method of a natural rubber master batch according to claim 1.

11. A rubber composition comprising the natural rubber master batch according to claim 10.

12. The rubber composition according to claim 11, which is one having silica dry mixed therein.

13. The rubber composition according to claim 12, wherein the silica is mixed in an amount of from 1 to 30 parts by mass based on 100 parts by mass of a natural rubber component in the natural rubber master batch.

14. A tire comprising the rubber composition according to claim 11.

15. The production method of a natural rubber master batch according to claim , wherein the compressed DBP oil absorption (24M4DBP) falls within the range of 50<24M4DBP (mL/100 g) ≤83 (more than 50 and not more than 83).

\* \* \* \* \*